United States Patent [19]
Kelley

[11] Patent Number: 4,719,566
[45] Date of Patent: Jan. 12, 1988

[54] METHOD FOR ENTRAPPING UNAUTHORIZED COMPUTER ACCESS

[75] Inventor: Henry H. Kelley, Glendale, Calif.

[73] Assignee: International Business Machines Corporation, Armonk, N.Y.

[21] Appl. No.: 790,582

[22] Filed: Oct. 23, 1985

[51] Int. Cl.[4] .............................................. G06F 15/00
[52] U.S. Cl. ................................. 364/200; 340/825.34
[58] Field of Search ............... 364/300, 200 MS File, 364/900 MS File; 380/23, 24, 25; 340/825.34, 825.31, 825.3, 835.37; 235/380, 382, 382.5; 379/95

[56] References Cited

U.S. PATENT DOCUMENTS

| | | | |
|---|---|---|---|
| 4,087,856 | 5/1978 | Attanasio | 364/200 |
| 4,525,599 | 6/1985 | Curran et al. | 178/22.08 |
| 4,531,023 | 7/1985 | Levine | 379/95 |
| 4,675,815 | 6/1987 | Kuroki et al. | 379/37 |

OTHER PUBLICATIONS

Beardsley, C. W., "Is Your Computer Insecure?", IEEE Spectrum, Jan. 1972, pp. 67–78.

Primary Examiner—Gareth D. Shaw
Assistant Examiner—Jonathan C. Fairbanks
Attorney, Agent, or Firm—R. Bruce Brodie

[57] ABSTRACT

A method of access validation whereby a false system becomes bound to an accessing user if an unacceptable accessing pattern is detected. The false system interacts in a mode similar to the conversational protocols of target systems but remains logically insulated from said target systems. Concurrent messages to security monitors at binding time ensure entrapment.

11 Claims, 6 Drawing Figures

VTAM/SNA-LIKE ENVIRONMENT WITH THE UNAUTHORIZED COMPUTER ACCESS PREVENTION METHODOLOGY ENHANCED ACCESS CONTROL

A VTAM/SNA-LIKE ENVIRONMENT WITH
ONLY BASIC ACCESS CONTROL (PRIOR ART)

A NON 'FRONT END' ENVIRONMENT WITH
ONLY BASIC ACCESS CONTROL

A NON 'FRONT END' ENVIRONMENT WITH THE UNAUTHORIZED COMPUTER ACCESS PREVENTION METHODOLOGY ENHANCED ACCESS CONTROL

METHOD FOR ENTRAPPING UNAUTHORIZED COMPUTER ACCESS

TECHNICAL FIELD

This invention relates to a method of entrapping users seeking unauthorized access to a computing system upon detection of predetermined unacceptable access patterns.

BACKGROUND

Access to a computer system in its broad sense connotes the utilization of computing resources to create, modify, or destroy information bound or associated with the computing resources. Access must embrace the notion of graded access. That is, some individuals must be absolutely barred under all circumstances from utilizing resources while others may participate for limited periods of time, utilizing combinations of resources, and/or data sets. With the advent of remote access capabilities in systems such as "dial-up access" and the easy availability of small "personal" computers, systems have become increasingly susceptible to the whims of the proverbial "hacker" who often will use a remote access path to avoid being easily located. Such an individual, usually with the aid of his own local computer, will try to penetrate the access barriers of a target dial-up computing system. The hacker can try random and adaptive patterns employing logon identities and passwords. Some prior art systems require the user to supply a single "password". More complex methods require more information be supplied by a user than a single password. Here, the speed and repetitive ease with with different passwords may be tried out permits the computer-assisted hacker to guess and/or adaptively constrain the number of trials until a true access to the target system can be achieved.

In the computer art, all prior VM authorization mechanisms rely principally upon a password match. In the event of mismatch or a repeated pattern of mismatch, entry is merely denied. In other systems, such as IBM's Resource Access Control Facility (RACF) described in OS/VS2 MVS RACF Command Language Reference, IBM publication SC28-0733, other criteria such as location or a value of a system clock may be used to control access. Significantly, it is known in the telephone art to bind an accessing instrument to other than a target system when a dialed number is mappable only onto either a false busy or a redial answer-back request.

Cannavino et al, U.S. Pat. No. 4,430,705, "Authorization Mechanism for Establishing Addressability to Information in Another Address Space", issued Feb. 7, 1984, shows an authorization mechanism by which a process in one logical interface or partition may access information in another logical interface or partition. Also of interest is Yost, copending U.S. patent application Ser. No. 06/459,746, filed Jan. 21, 1983, now abandoned, entitled "Controlling Multiple Distributed Computations in a Multi CPU Environment from a Single Port". Yost teaches a method for reconfiguring logical views and binding dissimilar real configurations to the logical views.

SUMMARY OF THE INVENTION

It is an object of this invention to device a method for entrapping users seeking unauthorized access to a computing system upon detection of predetermined unacceptable access patterns. It is a related object that such a method be utilizable in varying or dissimilar operating system environments, such as MVS and VM operating system environments.

The aforementioned objects are satisfied by a method in which the unauthorized access is actually connected to a false target which continues a conversational mode with the user. Because the user is bound to a false partition or interface and access paths to other partitions are blocked, then complete security may be preserved.

As applied to, for example, a virtual machine (VM) system, it should be recalled that a VM system has a plurality of logical interfaces. Each interface is of the demand/response message type and includes (1) a plurality of ports, (2) authorized user identity and password attributes, (3) an operating system requesting the demand/response message interfaces between the VM system and the ports, and data sets of which selected subsets are locked to at least one user/password attribute pair. Access to a target interface is made through a port by entry of an identity/attribute pair. The method for validating access in this context comprises the steps of (a) responsive to preselected patterns of identity/password attribute entries, binding the terminal through which the entries were made to a false interface instead of the target interface, the information states between the false and target interfaces being selectively dissimilar; and (b) causing the false interface to respond to entries from the port to which it is bound in an otherwise customary manner.

By logging all messages and sending alerts and selected messages from the false interface to a security monitor, an improvement in the ability to locate those attempting system penetration has been made by creating a more extensive audit trail and holding them on the line, so to speak, than would otherwise be available. This audit trail in the false interface would be clear evidence of unauthorized access and would provide a significant deterrent to unauthorized access by those aware of its installation. This is because access gained on the false system is always presumed to be unauthorized, and attempts to locate or apprehend the individual that gained such access would presumably follow on an immediate basis.

DESCRIPTION OF THE PREFERRED EMBODIMENT AND INDUSTRIAL APPLICABILITY

An operating system is a basic resource manager for a computing facility. Among the popular operating systems used with IBM/370 architecture include MVS and VM. These are respectively described in IBM publications OS/VS2 MVS System Programming Library, JES2, GC23-0002, and IBM Virtual Machine Facility/370 Introduction, GC20-1800. Although Deitel, "An Introduction to Operating Systems", Addison-Wesley Publishing Co., copyright 1984, at page 463 points out that systems should contain entrapment mechanisms to lure the unskilled penetrator, he further points out that most systems have inadequate entrapment mechanisms.

Figure 1:
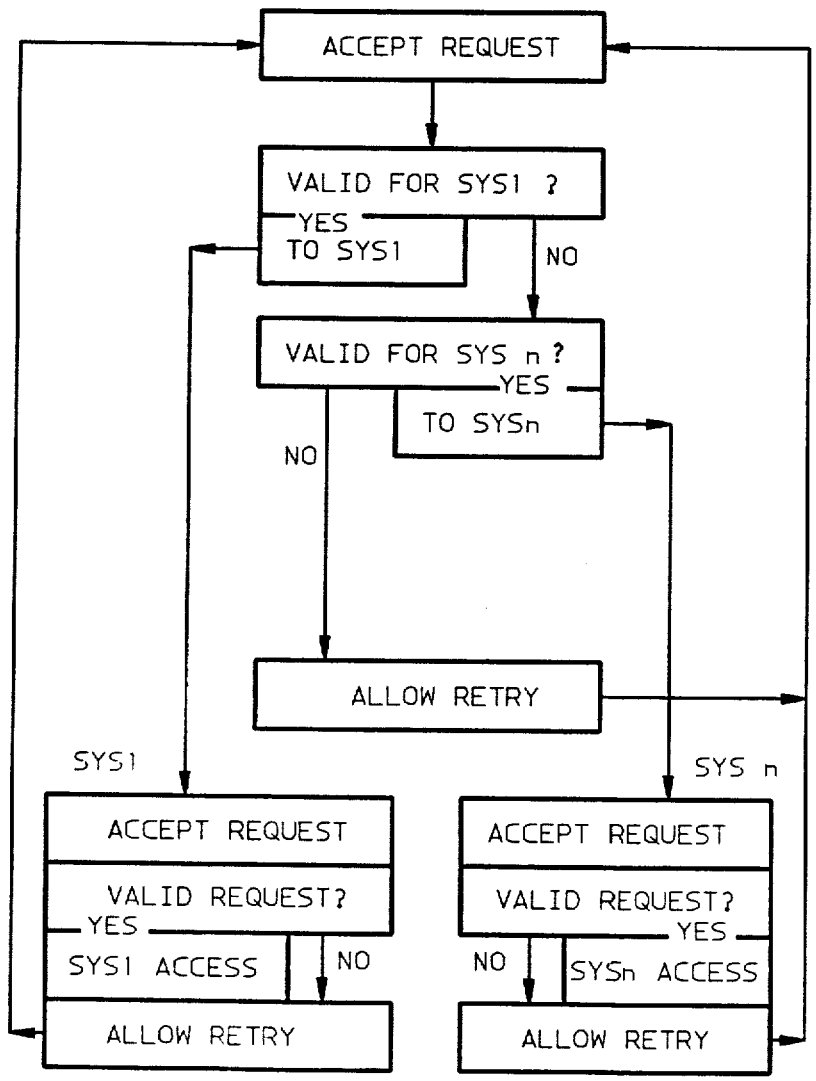
FIG. 1 depicts a VTAM/SNA environment with minimal access control as shown in the prior art.
Figure 2:
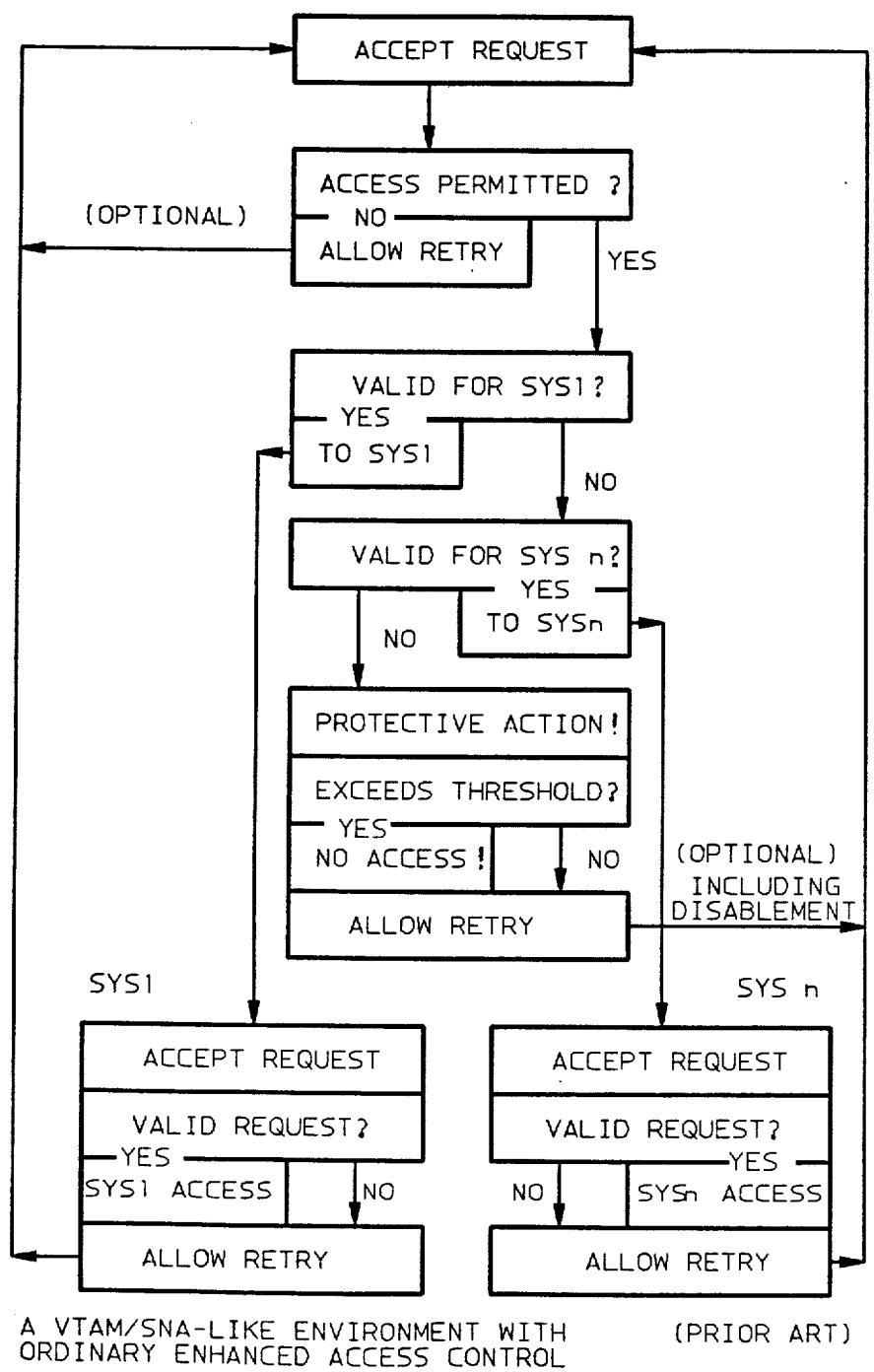
FIG. 2 depicts a similar environment with enhanced access control also shown in the prior art.
Figure 3:
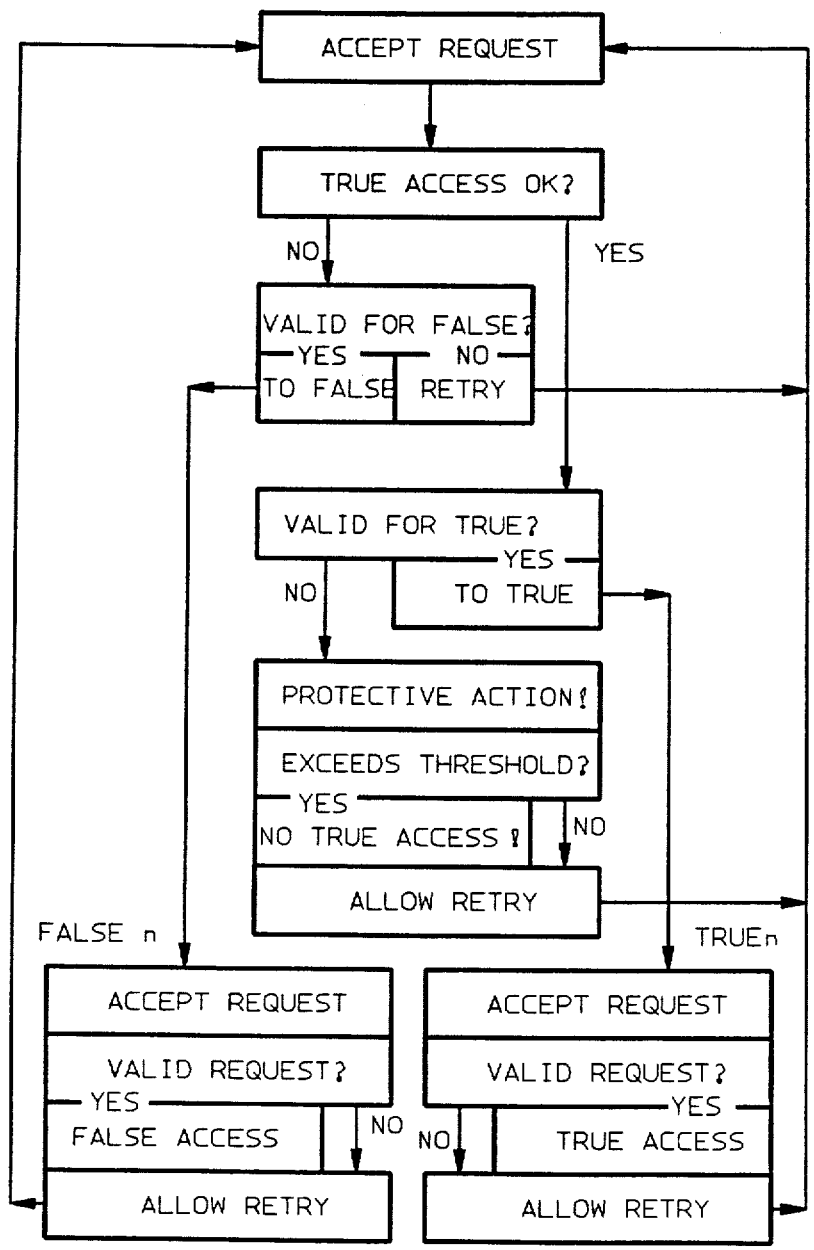
FIG. 3 sets out said VTAM/SNA environment illustrating the method according to the invention.
Figure 4:
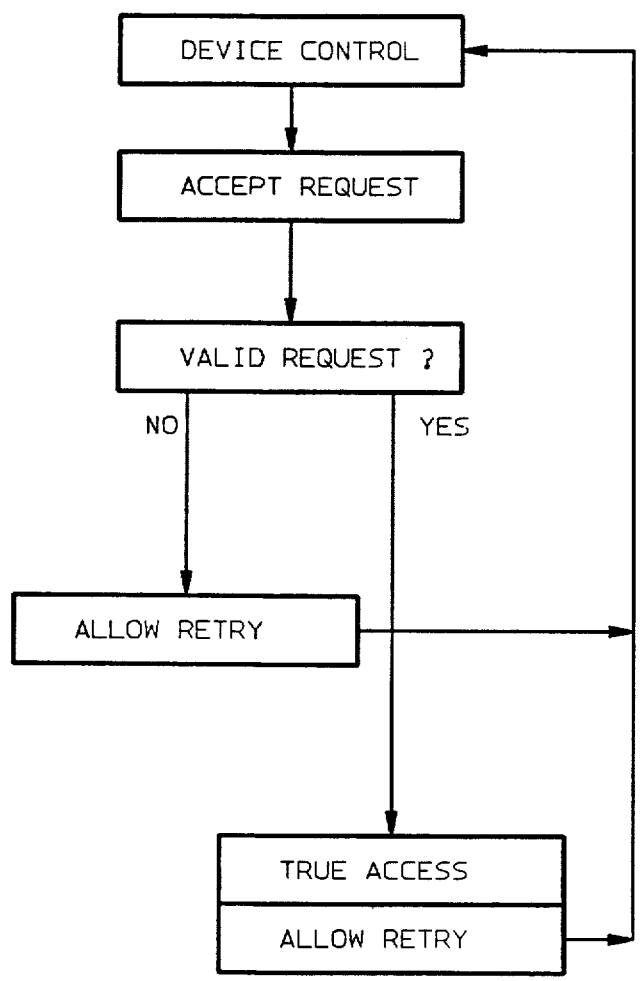
FIG. 4 shows a non-VTAM/SNA or native environment with basic access controls according to the prior art.
Figure 5:
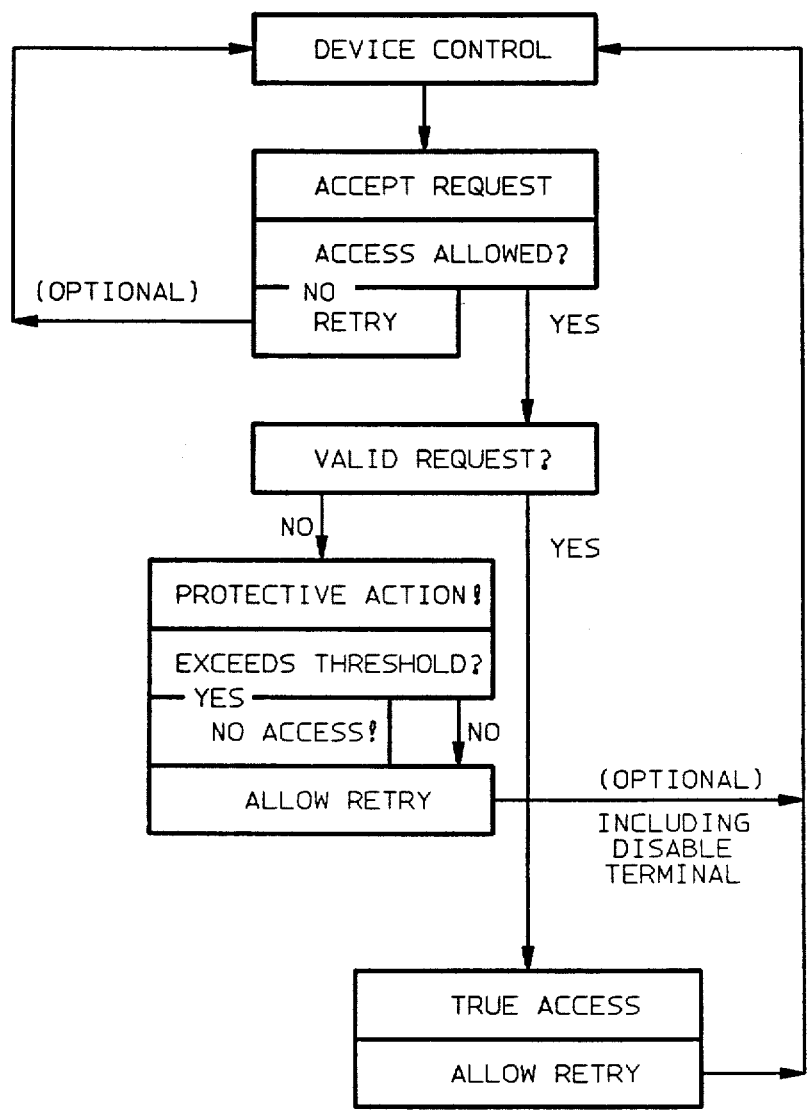
FIG. 5 illustrates such a front-end environment with enhanced access controls again according the prior art.
Figure 6:
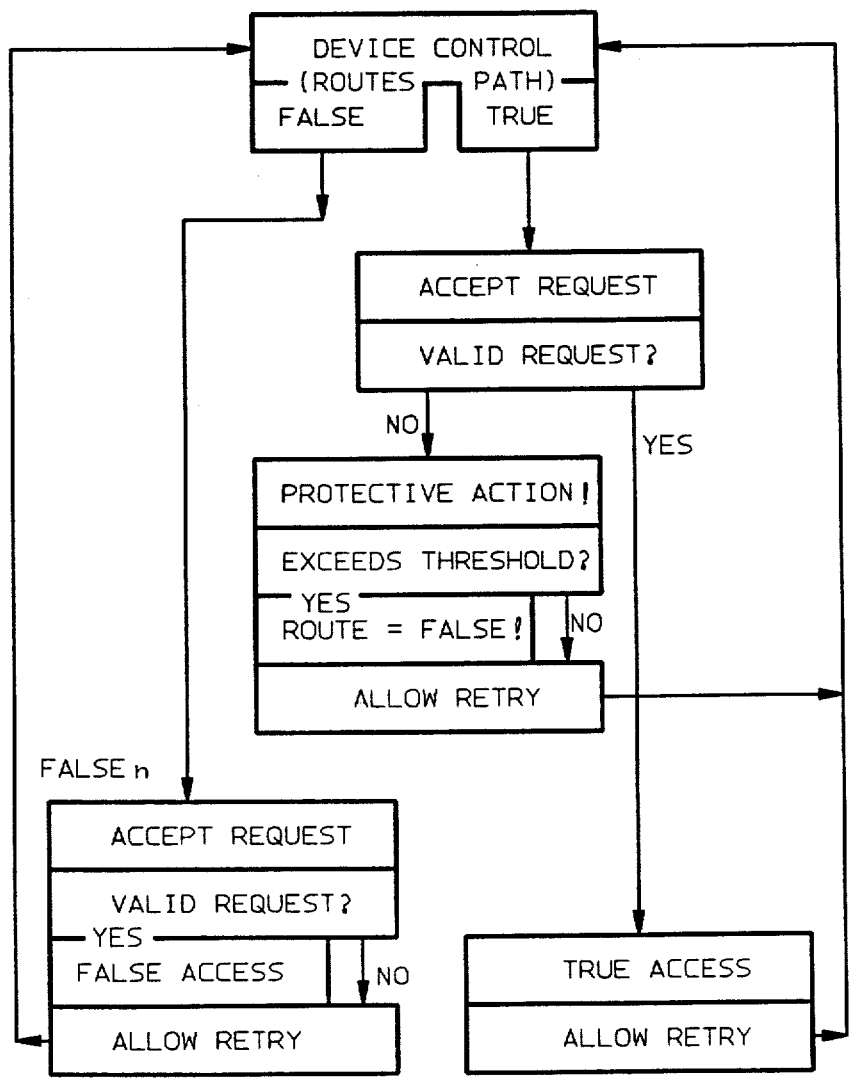
FIG. 6 illustrates such non-VTAM/SNA or front-end environment according to the method of the invention.

Referring now to FIGS. 1, 2, and 3, there is shown a high-level control flow of the access control implementation in a switched or front-end VTAM/SNA-like environment. Relatedly, FIGS. 4, 5, and 6 show equivalent implementation in "nonfront-end" or "dedicated path environments" such as VM without VTAM/SNA.

Referring now to FIG. 1, there is shown a VTAM/SNA environment with only basic access controls according to the prior art. This configuration permits a user to request access to one of "n" systems by specifying the identity of the desired destination or target system. This may or may not require additional data to verify that the user is authorized. This configuration does not prevent repeated invalid attempts to access a system.

Referring now to FIG. 2, there is shown a similar front-end VTAM/SNA environment with ordinary enhanced controls according to the prior art. In this situation, a user requests access to one of "n" systems by specifying the identity of the destination and setting forth additional data so as to verify that he is authorized to access said target system. This configuration does prevent repeated invalid attempts to access a system by way of threshold control. In contrast, the control flow shown in FIG. 3 utilizing a front-end environment binds an unauthorized penetration to a false or entrapment environment. FIGS. 4 and 5 show the same prior art basic and ordinarily enhanced access controls, while FIG. 6 shows the binding of such control to a false or entrapment environment according to the invention.

In the method of this invention, when an attempt at unauthorized access is made upon a processor such as by logging on using an invalid password, the system responds as follows:

(a) At and after a predetermined low threshold has been reached, each such invalid logon attempt is deemed reportable and a warning message is issued to, for example, a system operator or a security monitoring terminal.

(b) When the number of attempts exceeds a predetermined threshold, the port through which the attempt is being made is bound to a "false system" that is actually a "virtual" or a second-level VM system running under the control of the "true" system. An explicit warning is provided again to the appropriate monitoring points that the switch to the false system has taken place.

(c) If further attempts are detected after the offending "source" has been activated on the "false system", each attempt is reported to the same IDs previously warned. The warning specifies that the attempts were "from" the "false system".

(d) If an actual logon takes place on any device that has been switched to the "false system", warnings are issued that indicate that this has occurred.

(e) If an actual "logoff" takes place on any device that has been switched to the "false system", warnings are issued that indicate that this has occurred.

Included in this specification is a table setting out the most significant operating system executive routines and tables for implementing a preferred embodiment. The ensuing description is made with reference to this table.

In the subsequent description, it shall be assumed that the CPU node has a CICS/VS control system. Other computing facility resources are governed by the IBM/370 Principles of Operation as described in Amdahl et al, U.S. Pat. No. 3,400,371, "Data Processing System", issued Sept. 3, 1968. The system uses the node ID of LOSANGEL. It detects the fact that an invalid logon password has been supplied to it and, as previously mentioned, sends a warning message to the ID OPERATOR on the LOSANGEL system. This message describes the event and identifies the source of the attempt. When the Programmable Operator Facility Code running under the ID OPERATOR on the LOSANGEL system receives these messages, it redirects them to the SECSYS ID, also on the LOSANGEL system and also running Programmable Operator Facility Code, for further processing. When the Programmable Operator Facility Code running under the SECSYS ID receives the message, it invokes an action routine exec to process the messages and takes whatever action is required. The action routine is an exec and the identifier of the exec file is as indicated in the table INVALAS2 EXEC. One action that may be taken is to switch the source of the invalid logon password attempt to the false system. The false system is a virtual or second-level VM CP/CMS operating system that runs under the ID LAXPRESS on the LOSANGEL VM node ID. The switch causes the next attempt to access the LOSANGEL system to be treated as an actual attempt to access the false system LAXPRESS. Note, the falst system LAXPRESS represents an identifying logo that is indistinguishable from that presented by the true LOSANGEL system, and the transition from the real to the false system is equally transparent.

Referring now to the table, there is shown the INVALAS2 EXEC. The functions of this exec are invoked when control is passed to it. This exec makes a determination of the source of the invalid logon password, the ID for which the invalid password has provided, and the number of sequential times an invalid password has been provided from the source or from the ID. The exec always sends a warning message to each ID in a list of IDs that should be warned of an invalid logon password use. After this, the exec also ascertains whether it is permitted to take protective action. If permitted to take action, the exec determines if the number of "attempts" has reached a predefined threshold. Upon the threshold being reached, the offending source is disabled from accessing the LOSANGEL system and is attached to the false system LAXPRESS. The exec then issues commands to the false system LAXPRESS user ID. These commands are interpreted by the OPERATOR ID of the false system and creates a demand/response message interface between the offending source and the false system.

It is anticipated that the offending source connected to the false system will interact with the false system in a manner similar to that of the target system. To that extent, the operating system associated with LAXPRESS detects the fact that an invalid logon password has been supplied, that an actual logon has taken place, or that a logoff has occurred. Concurrent with these events, the associated operating system sends a message to the ID OPERATOR and the LAXPRESS system identifying the source.

When the Programmable Operator Facility Code running under the SECSYS ID on the true or target system LOSANGEL receives the messages, because it has been defined as the secondary console for the LAXPRESS ID, it invokes another action routine exec to process the messages and takes whatever action is required. If the received message indicates "invalid logon password", an exec named INVALAXP is invoked. This exec makes a determination of the source of the invalid logon password, sends a warning message to each ID on a list of IDs that should be warned of the invalid logon password use, and issues commands to the false system LAXPRESS user ID which are acted upon by the OPERATOR ID of the false system that cause the offending source to become disabled on the false system and then active again on the false system LAXPRESS. If the received message indicates an actual logon has occurred, an exec named REALLOG is invoked. The REALLOG EXEC makes a determination of the source of an invalid logon password and sends a warning message to each ID on a list of IDs that should be warned of an actual logon occurrence. If the received message indicates an actual logoff has occurred, the exec named LOGISOFF is invoked. The LOGISOFF EXEC sends a warning meassage to each ID on a list of IDs that should be warned of actual logoff occurrences.

Preferably, all of the user IDs that exist on the true system node LOSANGEL should be added to the User ID Directory on node LAXPRESS. This permits that any source attempting to access the true system LOSANGEL would also be prompted to enter the password on the LAXPRESS system, no matter what ID one might have been trying on the LOSANGEL node. None of these added IDs have a password that is valid on the LOSANGEL system. It is important in such a configuration that all devices that could be a switchable source of invalid logon passwords be added to the DMKRIO assembly on the LAXPRESS system so that any accessing source would not be able to detect that the switch had taken place by virtue of the fact that the address of the device had changed.

In such systems, attention to details are important so that the false or entrapping system appears to be a "true system". Thus, the logo that displays on consoles attached to the true system should appear to be the same as on the virtual false system. A Programmable Operator Facility Code running under the ID OPERATOR on the true LOSANGEL system is utilized to reroute messages directed to the OPERATOR ID by VM when VM detects the invalid logon passwords. The rerouting of these messages from the OPERATOR ID to the newly-installed SECSYS ID is accomplished by simply making an entry in the PROP RTABLE FILE belonging to the OPERATOR ID. The entry made directs the Programmable Operator Facility Code on the OPERATOR ID to send these particular messages to the SECSYS ID whenever they are received. Other entries made in the PROP RTABLE FILE used by the Programmable Operator Facility Code running under the SECSYS ID causes the code to pass control to an action routine exec whenever messages pertaining to invalid logon passwords are received from the ID OPERATOR by way of either the true system LOSANGEL or the false system LAXPRESS. Lastly, the PROP RTABLE FILE contains entries that cause appropriate routine execs to be invoked whenever messages indicating that either a logon or logoff has occurred on the LAXPRESS system have been received.

It is to be understood that the particular embodiments of the invention described above and shown in the drawing are merely illustrative and not restrictive of the broad invention.

```
***************************************************************
*     THE    PROP    RTABLE                                   *
***************************************************************

*         ----- SPECIFY THE PROP CONFIGURATION -----
* IDENTIFY THE LOGICAL OPERATOR
LGLOPR HENRY      LOSANGEL
* BLANK SEPARATOR IS '/', ARBCHAR SEPARATOR IS '$', "NOT" SYMBOL IS '¬'
TEXTSYM / $ ¬
* DO LOGGING WHEN THIS TABLE IS IN EFFECT
LOGGING ON
ROUTE         ----- END OF CONFIGURATION SPECIFICATION -----
*------------------------    ---  ---  --  --------  --------  --------  --------
*T                           S    E    T   U         N         A         P
*E                           C    C    Y   S         O         C         A
*X                           O    O    P   E         D         T         R
*T                           L    L    E   R         E         N         M
*------------------------    ---  ---  --  --------  --------  --------  --------
* TRAP MESSAGES BY CONTENT
*------------------------    ---  ---  --  --------  --------  --------  --------
$LOGGED
* CATCH THE INVALID LOGON PASSWORD ATTEMPTS
$LOGOFF/AS$¬AUTO              1        LAXPRESS  LOSANGEL  LOGISOFF  HENRY
* CATCH THE INVALID LOGON PASSWORD ATTEMPTS
$DMKJRL1451$LOGON             1        OPERATOR  LOSANGEL  INVALAS2  HENRY
```

```
$DMKJRL145I$LOGON                 1         LAXPRESS LOSANGEL INVALAXP HENRY
* CATCH THE REAL LOGON's
$¬AUTO$¬MSG$LOGON$USERS/=         1         LAXPRESS LOSANGEL REALLOG  HENRY
$DIALED=                          1         OPERATOR LOSANGEL SOURCE
$CREATED/FOR                      1         PVMPC    LOSANGEL SOURCE
$CREATED/FOR                      1         PVM3101  LOSANGEL SOURCE2
$DIALED/TO                        1         PVM3101  LOSANGEL SOURCE2
$ENDED/FOR                        1         PVMPC    LOSANGEL REROUTE
$CREATED/FOR                      1         PVM      LOSANGEL SOURCE
$ENDED/FOR                        1         PVM      LOSANGEL REROUTE
$MSG/FROM$UNLOCK$USER$CODE        1         LAXPRESS LOSANGEL UNLOCK
$UNLOCK/PATH                      1                  LOSANGEL UNLOCK2
$UNLOCK/CODE                      1                  LOSANGEL LOCKCODE
*--------------------------------- --- --- -- -------- -------- -------- --------
* SEND A CP OR CMS COMMAND TO VM TO BE EXECUTED
*--------------------------------- --- --- -- -------- -------- -------- --------
/CMD /                            1   4      HENRY             DMSPOR   TOVM
/CMD /                            1   4      CARNEY            DMSPOR   TOVM
/CMD /                            1   4      AUTOLOG1          DMSPOR   TOVM
/CMD /                            1   4      OPLASC            DMSPOR   TOVM
/CMD /                            1   4      RESTART           DMSPOR   TOVM
*--------------------------------- --- --- -- -------- -------- -------- --------
* QUERY PROGRAMMABLE OPERATOR SETTINGS
*--------------------------------- --- --- -- -------- -------- -------- --------
/QUERY /                          1   6      HENRY             DMSPOR   QUERY
/QUERY /                          1   6      CARNEY            DMSPOR   QUERY
*--------------------------------- --- --- -- -------- -------- -------- --------
* TRAP PROP LOG COMMAND, MESSAGE IS AUTOMATICALLY LOGGED
*--------------------------------- --- --- -- -------- -------- -------- --------
/LOG /                            1   4
*--------------------------------- --- --- -- -------- -------- -------- --------
* PLACE A FEEDBACK MESSAGE IN THE PROP FEEDBACK FILE
*--------------------------------- --- --- -- -------- -------- -------- --------
/FEEDBACK /                       1   9                        DMSPOR   TOFB
/FB /                             1   3                        DMSPOR   TOFB
*--------------------------------- --- --- -- -------- -------- -------- --------
* CHANGE SETTINGS OF PROGRAMMABLE OPERATOR
*--------------------------------- --- --- -- -------- -------- -------- --------
/SET /                            1   4      HENRY             DMSPOR   SET
/SET /                            1   4      CARNEY            DMSPOR   SET
*--------------------------------- --- --- -- -------- -------- -------- --------
* GET PROP LOG OR FEEDBACK FILE
*--------------------------------- --- --- -- -------- -------- -------- --------
/GET /                            1   4      HENRY             DMSPOR   GET
/GET /                            1   4      CARNEY            DMSPOR   GET
*--------------------------------- --- --- -- -------- -------- -------- --------
* LOAD A NEW ROUTING TABLE
*--------------------------------- --- --- -- -------- -------- -------- --------
/LOADTBL /                        1   8      HENRY             DMSPOL
/LOADTBL /                        1   8      CARNEY            DMSPOL
*--------------------------------- --- --- -- -------- -------- -------- --------
* CAUSE THE PROP TO PERFORM A NORMAL TERMINATION
*--------------------------------- --- --- -- -------- -------- -------- --------
/STOP /                           1   5      HENRY             DMSPOR   STOP
/STOP /                           1   5      CARNEY            DMSPOR   STOP
*--------------------------------- --- --- -- -------- -------- -------- --------
* FILTER OUT MESSAGES
*--------------------------------- --- --- -- -------- -------- -------- --------
```

```
*---------------------------------  ---  ---  --  --------  --------  --------  --------
                                                                      REROUTE
* SEND ALL OTHER TRAPPED DATA TO THE LOGICAL OPERATOR
*---------------------------------  ---  ---  --  --------  --------  --------  --------
                                                            DMSPOS    LGLOPR
*---------------------------------  ---  ---  --  --------  --------  --------  --------
*********************************************************************
* T H E    I N V A L A S 2    E X E C                               *
*********************************************************************

/* * * * * * * * * * * * * * * * * * * * * * * * * * * * * * * * */
/* DEFINE VARIABLES TO BE REFERENCED ( WITH DEFAULT VALUES )      */
/* * * * * * * * * * * * * * * * * * * * * * * * * * * * * * * * */
IF DATE(U) = '11/30/84' THEN EXIT;
IF DATE(U) = '12/01/84' THEN EXIT;
/* IF DATE(U) = '12/02/84' THEN EXIT; */

MAXATT= 7;            /* MAX # ATTEMPTS */
LNODE = 'NONE'        /* LOGON 'NODE'   */
LID   = 'NONE'        /* ID @ 'NODE'    */
LDEV  = 'NONE'        /* LOGICAL DEVICE */
RDEV  = 'NONE'        /* REAL DEVICE    */
DISABLED = 'NONE'     /* DISABLED DEV#  */
SWITCHED = 'NONE'     /* SWITCHED DEV#  */

/* * * * * * * * * * * * * * * * * * * * * * * * * * * * * * * * */
/* GET THE INPUTS, THE MESSAGE AND THE RTABLE PARAMETER           */
/* * * * * * * * * * * * * * * * * * * * * * * * * * * * * * * * */

PULL MSGIN              /* THIS WE PROCESS */
PULL PARAMETER          /* THIS WE IGNORE  */

/* * * * * * * * * * * * * * * * * * * * * * * * * * * * * * * * */
/* GET THE ID TRIED, LOGON DEVICE/PATH, AND ATTEMPT NUMBER        */
/* * * * * * * * * * * * * * * * * * * * * * * * * * * * * * * * */

PARSE VAR MSGIN 'USERID: ' LOGID 'AT ' LOGDEV 'WITH ' 'NO. ' PNUM 'HAS'
LOGID  = STRIP(LOGID)    /* ID TRIED */
LOGDEV = STRIP(LOGDEV)   /* PATH     */
PNUM   = STRIP(PNUM)     /* ATTEMPT# */

'CP M * ATTEMPT DETECTED =' LOGID LOGDEV PNUM   /* LOG ATTEMPT   */

/* * * * * * * * * * * * * * * * * * * * * * * * * * * * * * * * */
/* DETERMINE (IF POSSIBLE) THE TRUE DEVICE/PATH USED FOR ACCESS   */
/* * * * * * * * * * * * * * * * * * * * * * * * * * * * * * * * */

IF SUBSTR(LOGDEV,1,1) ¬= 'L' THEN              /* IF IT IS NOT LDEV */
   DO;
      RDEV = LOGDEV;                           /* WE HAVE THE SOURCE*/
   END;
ELSE                                           /* IT IS LOGICAL DEV */
   DO;                                         /* GET THE SOURCE    */
      LDEV = LOGDEV;
      'GLOBALV SELECT SECSYS STACK' LOGDEV     /* FROM GLOBALV      */
      PULL DADDR
```

```
       IF DADDR ¬= '' THEN PARSE VAR DADDR LNODE ',' LID ',' RDEV
       'CP M * SOURCE OF ATTEMPT =' LNODE LID RDEV
       IF RDEV = '0000' | RDEV = '' THEN RDEV = 'NONE';
    END;
    IF RDEV ¬= 'NONE' THEN
      DO;
         IF LENGTH(RDEV) > 3 THEN RDEV = SUBSTR(RDEV,2,3);
         'CP M * ACCESS DEVICE =' RDEV;              /* LOG THE REAL DEV  */
      END;

IF SUBSTR(RDEV,1,2)¬='0D' & SUBSTR(RDEV,1,2)¬='0C' & RDEV¬='NONE' THEN
      DO;
         IF RDEV ¬= '9E6' & RDEV ¬= '8C8' THEN
            DO;
               'CP M *' RDEV 'NOT BEING CONTROLLED';
               EXIT;
            END;
      END;

/* * * * * * * * * * * * * * * * * * * * * * * * * * * * * * * * * */
    /* TAKE ACTION TO REMOVE THIS SOURCE OF IRRITATION FROM THIS SYSTEM */
    /* * * * * * * * * * * * * * * * * * * * * * * * * * * * * * * * * */

/* * * * * * * * * * * * * * * * * * * * * * * * * * * * * * * * */
    /* DISABLE THE 'REAL' DEVICE/PATH (LINE, LOCAL GRAPHICS, ETC.) */
    /* * * * * * * * * * * * * * * * * * * * * * * * * * * * * * * * */

IF RDEV ¬= 'NONE' THEN                          /* IF DEVICE DETERMINED */
      DO;
         DISABLED = RDEV;
         'CP M * DISABLING DEVICE =' DISABLED;
         'CP DISABLE' DISABLED;                     /* DISABLE ON THIS SYSTEM*/
         'CP FORCE' 'LOGON'||DISABLED;              /* REMOVE POSSIBLE LOGO  */
      END;
    ELSE
      DO;
         DISABLED = 'NONE';
         'CP M * CANNOT DISABLE DEVICE =' RDEV;     /* NO DEV, CANNOT DISABLE*/
      END;

/* * * * * * * * * * * * * * * * * * * * * * * * * * * * * * * * */
    /* HANDLE PASSTHRU VIRTUAL MACHINE (IF USED/DIALED BY USER)     */
    /* * * * * * * * * * * * * * * * * * * * * * * * * * * * * * * * */

IF LNODE='LOSANGEL' THEN                        /* IF FROM LOCAL PVM MACH*/
      DO;
         IF SUBSTR(LID,1,6)='PCTERM' | SUBSTR(LID,1,4)='TTY-' THEN
            DO;                                     /* IF PVM   OR PCTERM'N' */
               PARSE VAR LID PART1 '-' PART2;
               IF PART1 = 'TTY' THEN
                  DO;
                     'CP M * DROPPING USER' PART1 PART2;
                     'CP SM PVM3101 DROP' PART1 PART2; /* DROP THE TTY LINE  */
                     'CP SL 1 SEC'                  /* ALLOW LINE TO DROP    */
                  END;
               ELSE
                  DO;
```

```
               'CP M * DROPPING USER' LNODE LID;
               'CP SM PVM3101 DROP USER' LNODE LID;   /* DROP THE PVM LINK */
               'CP SL 1 SEC'                          /* ALLOW LINK TO DROP*/
             END;
          IF DISABLED ¬= 'NONE' THEN
             DO;
               'CP FORCE' 'LOGON'||DISABLED;          /* REMOVE POSSIBLE LOGO */
               'CP SL 1 SEC'                          /* ALLOW A MOMENT       */
             END;
          IF SUBSTR(LID,1,6)='PCTERM' THEN            /* IF IT IS PCTERM'N'   */
             DO;
               'CP M * FORCING' LID
               'CP FORCE' LID                         /* FORCE THE PCTERM MACH */
               'CP SL 2 SEC'                          /* ALLOW LID FORCE TIME  */
               IF DISABLED ¬= 'NONE' THEN
                  DO;
                    'CP FORCE' 'LOGON'||DISABLED;     /* ONE MORE TIME (SAFE)*/
                    'CP SL 1 SEC'                     /* WAIT A LITTLE MORE   */
                  END;
               'CP M * AUTOLOGGING' LID
               'CP AUTOLOG ' LID;                     /* BRING BACK PCTERM'N' */
             END;
        END;
    END;

/* * * * * * * * * * * * * * * * * * * * * * * * * * * * * * * * * * * */
/* TAKE ACTION TO RESTORE OR SHUNT ACCESS PATH USED (IF DISABLED)       */
/* * * * * * * * * * * * * * * * * * * * * * * * * * * * * * * * * * * */

IF DISABLED ¬= 'NONE' THEN                            /* IF DEVICE DISABLED   */
   DO;
     IF PNUM < MAXATT THEN                            /* LIMIT WAS NOT EXCEEDED*/
        DO;                                           /* ,ALLOW TO STAY ON SYS */
          'CP M * ENABLING DEVICE =' DISABLED;
          'CP ENABLE' DISABLED;                       /* RESTORE TO SYSTEM    */
        END;
     ELSE                                             /* LIMIT WAS EXCEEDED,  */
        DO;                                           /* NEUTRALIZE HOSTILES ! */
          SWITCHED = DISABLED;
          'CP M * LIMIT EXCEEDED, SWITCHING DEVICE =' DISABLED;
          'CP M HENRY LIMIT EXCEEDED, SWITCHING DEVICE =' DISABLED;
          'CP SL 1 SEC'
          'CP ATT' DISABLED 'LAXPRESS' SWITCHED;
          'CP SL 1 SEC'
          'EXEC SENDXP DISABLE' SWITCHED;
          'CP SL 1 SEC'
          'EXEC SENDXP FORCE' 'LOGON'||SWITCHED;
          'CP SL 1 SEC'
          'EXEC SENDXP VARY ON' SWITCHED;
          'CP SL 1 SEC'
          'EXEC SENDXP ENABLE' SWITCHED;
        END;
   END;
ELSE                                                  /* NO DEVICE DISABLED   */
DO;
   'CP M * NO DEVICE DISABLED, DEVICE ID =' DISABLED;
END;
```

```
/* * * * * * * * * * * * * * * * * * * * * * * * * * * * * * */
/* ISSUE APPROPRIATE WARNINGS USING DATA OBTAINED FROM WARNLIST EXEC */
/* * * * * * * * * * * * * * * * * * * * * * * * * * * * * * */

OLDSTACK = QUEUED();
MAKEBUF;
'EXEC WARNLIST';
DO WHILE QUEUED() > OLDSTACK
   PULL STACKIN
   'CP' STACKIN '* * * * * * * * * * * * * *';
   'CP' STACKIN 'POSSIBLE UNAUTHORIZED LOGON ATTEMPT FROM LOSANGEL';
   'CP' STACKIN MSGIN;
   'CP' STACKIN 'USERID ATTEMPT WAS FOR ID =' LOGID;
   'CP' STACKIN 'ATTEMPT WAS FROM DEVICE' RDEV;
   IF SWITCHED ¬= 'NONE' THEN
      'CP' STACKIN 'DEVICE' SWITCHED 'WAS SWITCHED TO SECURE SYSTEM';
   IF SWITCHED = 'NONE' THEN
      'CP' STACKIN 'DEVICE' RDEV 'NOT SWITCHED TO SECURE SYSTEM';
   'CP' STACKIN '* * * * * * * * * * * * * *';
END;
DROPBUF;

EXIT;
***********************************************************************
* T H E    I N V A L X P    E X E C                                   *
***********************************************************************

&TRACE OFF
&READ VARS &A &B &C &D &E &F &G &H &I &J &K &L &M &N &O &P
&READ VARS &INPARM
*DV = &SUBSTR OF &F 2 3
&DV = &F
*---------------------------------------------------------------
-WARNEM
&STACK LIFO ENDWARN
EXEC WARNLIST
-TRYAGN
&READ STRING &WRNHDR
&IF &WRNHDR EQ ENDWARN &GOTO -DUNWRN
CP &WRNHDR * * * * * * * * * * * * * *
&IF &RETCODE NE 0 &GOTO -TRYAGN
CP &WRNHDR POSSIBLE UNAUTHORIZED LOGON ATTEMPT ON SECURITY SYSTEM
CP &WRNHDR &A &B &C &D &E &F &G &H &I &J &K &L &M &N &O &P &Q &R
CP &WRNHDR USERID ATTEMPT WAS FOR ID = &D
CP &WRNHDR ATTEMPT WAS FROM DEVICE &DV
CP &WRNHDR * * * * * * * * * * * * * *
&GOTO -TRYAGN
-DUNWRN
*---------------------------------------------------------------
*
CP SL 1 SEC
EXEC SENDXP DISABLE &DV
CP SL 3 SEC
EXEC SENDXP FORCE LOGON&DV
CP SL 2 SEC
EXEC SENDXP ENABLE &DV
*
&EXIT 0
```

```
****************************************************************
*    T H E     R E A L L O G     E X E C                       *
****************************************************************

&TRACE OFF
&READ VARS &A &B &C &D &E &F &G &H &I &J &K &L &M &N &O &P &Q
&READ VARS &INPARM
*----------------------------------------------------------------
-WARNEM
&STACK LIFO ENDWARN
EXEC WARNLIST
-TRYAGN
&READ STRING &WRNHDR
&IF &WRNHDR EQ ENDWARN &GOTO -DUNWRN
CP &WRNHDR * * * * * * * * * * * * * * * * * * * * * * * *
&IF &RETCODE NE 0 &GOTO -TRYAGN
CP &WRNHDR WARNING ! UNAUTHORIZED LOGON - HAS OCCURRED - WARNING !
CP &WRNHDR * * * * * * * * * * * * * * * * * * * * * * * *
CP &WRNHDR UNAUTHORIZED LOGON HAS OCCURRED ON SECURITY SYSTEM !
CP &WRNHDR &A &B &C &D &E &F &G &H &I &J &K &L &M &N &O &P &Q &R
CP &WRNHDR * * * * * * * * * * * * * * * * * * * * * * * *
&GOTO -TRYAGN
-DUNWRN
*----------------------------------------------------------------
&EXIT 0

****************************************************************
*    T H E     L O G I S O F F     E X E C                     *
****************************************************************

&TRACE OFF
&READ VARS &A &B &C &D &E &F &G &H &I &J &K &L &M &N &O &P
&READ VARS &NME
*----------------------------------------------------------------
-WARNEM
&STACK LIFO ENDWARN
EXEC WARNLIST
-TRYAGN
&READ STRING &WRNHDR
&IF &WRNHDR EQ ENDWARN &GOTO -DUNWRN
CP &WRNHDR * * * * * * * * * * * * * * * * * * * * * * * *
&IF &RETCODE NE 0 &GOTO -TRYAGN
CP &WRNHDR LOGOFF FROM SECURITY SYSTEM HAS OCCURRED !
CP &WRNHDR &A &B &C &D &E &F &G &H &I &J &K &L &M &N &O &P
CP &WRNHDR * * * * * * * * * * * * * * * * * * * * * * * *
&GOTO -TRYAGN
-DUNWRN
*----------------------------------------------------------------
&EXIT 0

****************************************************************
*    T H E     W A R N L I S T     E X E C                     *
****************************************************************

&TRACE OFF
*
* WARNING: ALL ITEMS STACKED BY THIS
*          EXEC MUST BE 'CP' EXECUTABLE
```

```
*           -- SUCH AS 'M','SM','MSGNOH',
*              'WARN', ETC.
*
* SAMPLE FOR USING RSCS FOR MSGS
*'SM RSCS MSG LOSANGEL HENRY'
*-----------------------------------
*SGNOH JIM
&BEGSTACK -ENDSTK * LIFO
MSGNOH JIM
MSGNOH HENRY
MSGNOH OPLASC
-ENDSTK
&EXIT 0
```

```
***********************************************************
* T H E   T O S C   E X E C                               *
***********************************************************

&TRACE OFF
CP DISABLE &1
EXEC SENDXP DISABLE &1
CP SL 2 SEC
CP FORCE LOGON&1
EXEC SENDXP FORCE LOGON&1
CP SL 1 SEC
EXEC SENDXP DISABLE &1
CP SL 1 SEC
EXEC SENDXP VARY OFF &1
CP SL 1 SEC
CP DETACH &1 LAXPRESS
CP SL 1 SEC
CP ENABLE &1
```

```
***********************************************************
* T H E   R E R O U T E   E X E C                         *
***********************************************************

/* * * * * * * * * * * * * * * * * * * * * * * * * * */
/* THIS EXEC ROUTES ALL INCOMING MESSAGES TO 'DESTINATION' ID  */
/* SPECIFIED BY THE SECOND INPUT (PROP RTABLE PARAMETER VALUE) */
/* * * * * * * * * * * * * * * * * * * * * * * * * * */
NOTHING = '';                       /* DO 'NOTHING' FOR CLARITY*/
PULL MESSAGE;                       /* GET THE INPUT MESSAGE   */
IF MESSAGE = NOTHING THEN EXIT;     /* IF NO MESSAGE THEN QUIT */
PULL DESTINATION;                   /* GET THE PROP PARAMETER  */
IF DESTINATION = NOTHING THEN EXIT; /* IF NO DESTINATION, QUIT */
'CP MSGNOH' DESTINATION MESSAGE;    /* SEND MSG TO DESTINATION */
EXIT;                               /* EXIT, TASK COMPLETED    */
```

```
***********************************************************
* T H E   S E N D X P   E X E C                           *
***********************************************************

&TRACE OFF
CP SEND LAXPRESS &1 &2 &3 &4 &5 &6 &7 &8 &9 &10 &11 &12 &13
```

```
***************************************************************
*   T H E    S O U R C E    E X E C                            *
***************************************************************

/* * * * * * * * * * * * * * * * * * * * * * * * * * * * * * */
/* REXXHDR                                                   */
/* * * * * * * * * * * * * * * * * * * * * * * * * * * * * * */
/* GET THE INPUTS, THE MESSAGE AND THE RTABLE PARAMETER */
PULL MSGIN     /* THIS WE PROCESS */
PULL PARAMETER /* THIS WE IGNORE  */

/* IF 'DIALED TO' OR 'CREATED FOR' THEN LETS */
/* SAVE THE 'SOURCE' OF ACCESS FOR LATER USE */

/* INITIALIZE VARIABLES */
DAT1 = ''
DAT2 = ''
DAT3 = ''

/* SEE IF IT IS 'DIALED TO' OR 'CREATED FOR' */
SELECT;

/* IF 'DIALED TO' THEN GET THE ADDRESS THE 'DIAL' WAS FROM */
   /* SO WE CAN LATER RESOLVE '0000' ADDRESSES (PCTERM TYPE)  */
   WHEN FIND(MSGIN,'DIALED TO') ¬= 0 THEN
      DO;
         PARSE VAR MSGIN JNK1 DAT1 DAT2 ' DIALED TO ' VNAME REST;
      END;

/* IF 'CREATED FOR' THEN SAVE THE 'NODE,ID, AND ADDRESS' */
   WHEN FIND(MSGIN,'CREATED FOR') ¬= 0 THEN
      DO;
         PARSE VAR MSGIN JNK1 VNAME ' CREATED FOR ' DAT1 DAT2 JNK2 DAT3;
         /* IF 'ADDR = 0000' THEN USE 'DIALED TO' VALUE IF AVAILABLE */
         IF DAT3 = '0000' THEN
            DO;
               'GLOBALV SELECT SECSYS STACK' DAT2
               PULL DADDR
               IF DADDR ¬= '' THEN PARSE VAR DADDR JNK1 ',' DAT3 ',';
            END;
      END;

/* IF NOTHING FOUND THEN SO INDICATE */
   OTHERWISE VNAME = 'NONE';
END;

/* IF WE GOT SOME INFO THEN PUT IT IN GLOBALV */
IF VNAME ¬= 'NONE' THEN
   DO;
      VDAT = DAT1||','||DAT2||','||DAT3
      'GLOBALV SELECT SECSYS SET' VNAME VDAT  /* PUT IN GLOBALV */
      'CP M * ' VNAME '=' VDAT                /* PUT IN LOG (IF ANY) */
   END;
```

```
*****************************************************************
*  T H E    S O U R C E 2    E X E C                             *
*****************************************************************

/* * * * * * * * * * * * * * * * * * * * * * * * * * * * * * * */
/* REXXHDR                                                     */
/* * * * * * * * * * * * * * * * * * * * * * * * * * * * * * * */
/* GET THE INPUTS, THE MESSAGE AND THE RTABLE PARAMETER */
PULL MSGIN      /* THIS WE PROCESS */
PULL PARAMETER  /* THIS WE IGNORE  */

/* IF 'DIALED TO' OR 'CREATED FOR' THEN LETS */
/* SAVE THE 'SOURCE' OF ACCESS FOR LATER USE */

/* INITIALIZE VARIABLES */
DAT1 = ''
DAT2 = ''
DAT3 = ''

/* SEE IF IT IS 'DIALED TO' OR 'CREATED FOR' */
SELECT;

/* IF 'DIALED TO' THEN GET THE ADDRESS THE 'DIAL' WAS FROM */
   /* SO WE CAN LATER RESOLVE '0000' ADDRESSES (PCTERM TYPE)  */
   WHEN FIND(MSGIN,'DIALED TO') ¬= 0 THEN
      DO;
         PARSE VAR MSGIN JNK1 DAT1 DAT2 ' DIALED TO ' VNAME REST;
         IF DAT1 ¬= 'TTY' THEN EXIT;
         VNAME = 'TTY-'||VNAME;
         DAT1 = 'LINE';
      END;

/* IF 'CREATED FOR' THEN SAVE THE 'NODE,ID, AND ADDRESS' */
   WHEN FIND(MSGIN,'CREATED FOR') ¬= 0 THEN
      DO;
         PARSE VAR MSGIN JNK1 JNK2 VNAME ' CREATED FOR ' DAT1 DAT2;
         IF JNK2 ¬= 'TASK' THEN EXIT;
         TVNAM = SUBSTR(VNAME,2,3);
         VNAME = 'L'||TVNAM;
         'GLOBALV SELECT SECSYS STACK' DAT2
         PULL DADDR
         IF DADDR ¬= '' THEN PARSE VAR DADDR JNK1 ',' DAT3 ',';
      END;

/* IF NOTHING FOUND THEN SO INDICATE */
   OTHERWISE VNAME = 'NONE';
END;

/* IF WE GOT SOME INFO THEN PUT IT IN GLOBALV */
IF VNAME ¬= 'NONE' THEN
   DO;
      VDAT = DAT1||','||DAT2||','||DAT3
      'GLOBALV SELECT SECSYS SET' VNAME VDAT  /* PUT IN GLOBALV */
      'CP M * ' VNAME '=' VDAT                /* PUT IN LOG (IF ANY) */
   END;
```

```
******************************************************
* T H E   L O C K C O D E   E X E C                  *
******************************************************
/* * * * * * * * * * * * * * * * * * * * * * * * * * */
/* GET THE INPUTS, THE ARGS, THE MESSAGE, AND THE RTABLE PARAMETER */
/* * * * * * * * * * * * * * * * * * * * * * * * * * */

USER    = '';
CODE    = '';
RECORD  = '';
MATCH   = '';
FILEID  = 'UNLOCK CODES A'

ARG RUID RNID LUID LNID MTC PUID PNID NUID RFN;
/* * * * * * * * * * * * * * * * * * * * * * * */
/*                 -ARGS-                      */
/* RUID + RNID = REQUESTORS USER AND NODE ID   */
/* LUID + LNID = LOGICAL OP USER AND NODE ID   */
/* MTC         = MESSAGE TYPE CODE             */
/* PUID + PNID = PROGRAMMABLE OP USER ID AND NODE ID */
/* NUID        = NETWORKING MACHINE USER ID    */
/* RFN         = RTABLE FILENAME               */
/* * * * * * * * * * * * * * * * * * * * * * * */

IF RNID ¬= PNID THEN EXIT;
IF SUBSTR(RUID,1,4)= 'LOGO' THEN EXIT;
IF SUBSTR(RUID,1,4)= 'TTY-' THEN EXIT;

PULL MSGIN              /* THIS WE PROCESS */
PULL PARAMETER          /* THIS WE IGNORE  */

PARSE VAR MSGIN FUNC 'UNLOCK CODE' CODE

FUNC  = STRIP(FUNC);
USER  = STRIP(RUID);
CODE  = SPACE(CODE);

IF ABBREV('SET',FUNC) = 0 & ABBREV('QUERY',FUNC) = 0 THEN
  DO;
    EXIT;
  END;

IF ABBREV('SET',FUNC) = 1 THEN
  DO;
    TCODE = SPACE(CODE,0);
    IF LENGTH(TCODE) < 8 THEN
      DO;
        'CP MSGNOH' RUID 'MSG FROM SECSYS :' 'ERROR: UNLOCK CODE LESS
                                              THAN 8 CHARACTERS';
        EXIT;
      END;
  END;
MAKEBUF;

'STATE' FILEID;
READONE = RC;
```

```
IF READONE = 0 THEN
  DO;
    DSTRING = '/USER='||USER||'/'
    'EXECIO * DISKR' FILEID '(FINI LO' DSTRING;
    READONE = RC;
  END;

IF READONE = 0 THEN
  DO;
    PULL RELATIVE ABSOLUTE;
    PULL RECORD;
    IF ABBREV('QUERY',FUNC) = 1 THEN
      DO;
        'CP MSGNOH' RUID 'MSG FROM SECSYS  :' RECORD;
        EXIT;
      END;
    IF ABSOLUTE = '' THEN ABSOLUTE = 0;
  END;
ELSE
  DO;
    ABSOLUTE = 0;
    IF ABBREV('QUERY',FUNC) = 1 THEN
      DO;
        'CP MSGNOH' RUID 'MSG FROM SECSYS  :' 'NO UNLOCK CODE FOUND FOR
                                                             USER='||RUID;
        EXIT;
      END;
  END;

DROPBUF;

IF ABBREV('SET',FUNC) = 1 THEN
  DO;
    DSTRING = 'USER='||USER||' '||'CODE='||' '||CODE;
    'EXECIO 1 DISKW' FILEID ABSOLUTE 'F 200 (FINI ST' DSTRING;
    READONE = RC;
  END;

IF READONE = 0 THEN
  DO;
    'CP MSGNOH' RUID 'MSG FROM SECSYS  :' 'UNLOCK CODE SET:' DSTRING ;
  END;
ELSE
  DO;
    'CP MSGNOH' RUID 'MSG FROM SECSYS  :' 'UNABLE TO SET UNLOCKCODE =
                                                       ' DSTRING;
    'CP MSGNOH' RUID 'MSG FROM SECSYS  :' 'ERROR: RETURN CODE FROM
                                                EXECIO =' READONE;
  END;

EXIT;
*********************************************************************
* T H E   U N L O C K   E X E C                                     *
*********************************************************************
/* * * * * * * * * * * * * * * * * * * * * * * * * * * * * * * * */
/* GET THE INPUTS, THE ARGS, THE MESSAGE, AND THE RTABLE PARAMETER */
/* * * * * * * * * * * * * * * * * * * * * * * * * * * * * * * * */
```

```
LOGON   = '';
USER    = '';
CODE    = '';
RECORD  = '';
MATCH   = '';
FILEID  = 'UNLOCK CODES *'

ARG RUID RNID LUID LNID MTC PUID PNID NUID RFN;
/* * * * * * * * * * * * * * * * * * * * * * * * * */
/*                  -ARGS-                         */
/* RUID + RNID = REQUESTORS USER AND NODE ID       */
/* LUID + LNID = LOGICAL OP USER AND NODE ID       */
/* MTC         = MESSAGE TYPE CODE                 */
/* PUID + PNID = PROGRAMMABLE OP USER ID AND NODE ID */
/* NUID        = NETWORKING MACHINE USER ID        */
/* RFN         = RTABLE FILENAME                   */
/* * * * * * * * * * * * * * * * * * * * * * * * * */

PULL MSGIN              /* THIS WE PROCESS */
PULL PARAMETER          /* THIS WE IGNORE  */

PARSE VAR MSGIN DMSG DFROM LOGON ':' UNLOCKCOM 'USER' USER 'CODE' CODE;
IF LOGON = '' | USER = '' | CODE = '' | UNLOCKCOM ¬= 'UNLOCK' THEN EXIT;

LOGON = STRIP(LOGON);
USER  = STRIP(USER);
CODE  = SPACE(CODE,0)

MAKEBUF;

DSTRING = '/USER='||USER||'/'
'EXECIO * DISKR' FILEID '(FINI LO' DSTRING;
READONE = RC;

IF READONE = 0 THEN
   DO;
      PULL RELATIVE ABSOLUTE;
      PULL RECORD;
      PARSE VAR RECORD 'CODE=' TRUECODE;
      TRUECODE = SPACE(TRUECODE,0);
      IF CODE = TRUECODE THEN MATCH = 'YES';
   END;
ELSE
   DO;
      'CP M * USER RECORD NOT FOUND FOR USER =' USER;
   END;

DROPBUF;
IF MATCH = 'YES' THEN
   DO;
      SUBLGN = SUBSTR(LOGON,1,5);
      NUMLGN = SUBSTR(LOGON,6,3);
      IF SUBLGN='LOGON' & LENGTH(LOGON)=8 & DATATYPE(NUMLGN,X)=1 THEN
         DO;
            'CP M * SWITCHING' NUMLGN 'BACK TO MAIN SYSTEM';
            'EXEC TOSC' NUMLGN;
         END;
```

```
      ELSE
        DO;
          'CP M * NOT SWITCHING ------>' LOGON 'BACK TO MAIN SYSTEM';
        END;
    END;

EXIT;

/*******************************************************************/
* T H E   U N L O C K 2   E X E C                                   *
/*******************************************************************/

/* * * * * * * * * * * * * * * * * * * * * * * * * * * * * * * * */
/* GET THE INPUTS, THE ARGS, THE MESSAGE, AND THE RTABLE PARAMETER */
/* * * * * * * * * * * * * * * * * * * * * * * * * * * * * * * * */

ARG RUID RNID LUID LNID MTC PUID PNID NUID RFN;
/* * * * * * * * * * * * * * * * * * * * * * * * * * */
/*                   -ARGS-                          */
/* RUID + RNID = REQUESTORS USER AND NODE ID         */
/* LUID + LNID = LOGICAL OP USER AND NODE ID         */
/* MTC         = MESSAGE TYPE CODE                   */
/* PUID + PNID = PROGRAMMABLE OP USER ID AND NODE ID */
/* NUID        = NETWORKING MACHINE USER ID          */
/* RFN         = RTABLE FILENAME                     */
/* * * * * * * * * * * * * * * * * * * * * * * * * * */

IF RUID¬='OPLASC'&RUID¬='JIM'&RUID¬='HENRY'&RUID¬='CARNEY' THEN EXIT;

ADDR = '';

PULL MSGIN              /* THIS WE PROCESS */
    PULL PARAMETER          /* THIS WE IGNORE  */

PARSE VAR MSGIN UNLK PTH ADDR;
    IF ADDR = '' THEN EXIT;

ADDR = STRIP(ADDR);

IF UNLK = 'UNLOCK' & PTH = 'PATH' & DATATYPE(ADDR,X) = 1 THEN
      DO;
        'CP M' RUID 'UNLOCKING PATH' ADDR;
        'CP M * UNLOCKING PATH' ADDR;
        'EXEC TOSC' ADDR;
      END;
    ELSE
      DO;
        'CP M * INCORRECT ADDRESS -->' ADDR;
        'CP M' RUID 'INCORRECT ADDRESS -->' ADDR;
      END;

EXIT;
```

The description of the embodiment is deemed illustrative and not limiting in that other aspects of the invention including equivalents will be appreciated by those skilled in the art upon reading the specification and claims.

What is claimed is:

1. A method for entrapping and maintaining a communication relationship between a user seeking unauthorized access to and a system, said system being of the multiprocessing, multiprogramming computing system type, said access and communication being through one of a plurality of logically partitioned and isolated demand/response message interfaces included within said system, each interface manifesting the attributes of a virtual machine having associated computational, storage, and dialog resources, comprising the steps of:

(a) ascertaining whether or not a pattern of access by a user to a target interface managed by the system is unacceptable, and binding the user either (1) to a false interface upon ascertaining any unacceptable pattern or (2) to the target interface if the access is found to be acceptable; and (b) upon binding the user to said false interface, causing the false interface to respond to messages from the user in a manner otherwise customary among accepted system users and interfaces.

2. A method according to claim 1, wherein the interfaces include a system security monitor, and wherein step (a) further comprises the step of: alerting the security monitor concurrently upon either ascertaining any unacceptable access pattern or binding the user to the false interface;

wherein step (b) further comprises the steps of: logging messages transmitted across the false interface, detecting messages having predetermined control or accessing information, and copying any detected messages to the security monitor.

3. A method according to claim 1, wherein the system is managed under an operating system selected from the set consisting of MVS/TSO or VM/CMS.

4. A method for entrapping and maintaining a communication relationship between a user seeking unauthorized access to and a system, said system being of the multiprocessing, multiprogramming computing system type, said access and communication being through one of a plurality of logically partitioned and isolated demand/response message interfaces included within said system, each interface manifesting the attributes of a virtual machine having associated computational, storage, and dialog resources, said system further including a security monitor communicatively coupling said interfaces, comprising the steps of:

(a) ascertaining whether or not a pattern of access by a user to a target interface managed by the system is unacceptable, and binding the user either (1) to a false interface and thereafter alerting the security monitor upon ascertaining any unacceptable access pattern or (2) to the target interface if the access is found to be acceptable; and (b) upon binding the user to the false interface, causing the false interface to respond to messages from the user in a manner otherwise customary among accepted system users and interfaces, and including the further steps of:

(1) logging messages transmitted across the false interface;
(2) detecting messages having predetermined control or accessing information; and
(3) copying any detected messages to the security monitor.

5. A method according to claim 4, wherein the predetermined control or access information includes the commands LOGON, LOGOFF, or UNLOCK.

6. A method according to claim 4, wherein the path to any system resource bound to the target interface is maintained impervious to access by commands issued across the false interface.

7. A method according to claim 4, wherein the system is managed under an operating system selected from the set consisting of MVS/TSO or VM/CMS.

8. A method for validating access of a user to a VM system, said VM system having a plurality of logical partitions, each partition including (1) a plurality of ports, (2) authorized identity and password attributes, (3) an operating system defining demand/response interfaces between ports and partitions, and (4) data sets lockable to at least one identity/password attribute pair; access to a target partition being made through a port by entry of an acceptable identity/password attribute pair; comprising the steps of:

(a) responsive to preselected patterns of identity/password attribute entries, binding the port through which the entries were made to a false partition instead of a target partition, the information states between the false and target partitions being selectively dissimilar; and (b) causing the false partition to respond to messages from the port to which it is bound in an otherwise customary manner.

9. A method according to claim 8, wherein the partitions include a system security monitor, and wherein step (a) further comprises the step of: alerting the security monitor concurrently with binding the user to the false partition;

wherein step (b) further comprises the steps of: logging messages transmitted between the false partition and the port, detecting messages having predetermined control or accessing information, and copying any detected messages to the security monitor.

10. A method according to claim 9, wherein the predetermined control or access information includes the commands LOGON, LOGOFF, or UNLOCK.

11. A method according to claim 9, wherein the path to any system resource bound to the target interface is maintained impervious to access by commands issued by or through the false partition.

* * * * *